United States Patent [19]
Coran et al.

[11] Patent Number: 5,889,119
[45] Date of Patent: Mar. 30, 1999

[54] THERMOPLASTIC RUBBERY COMPOSITIONS

[75] Inventors: Aubert Y. Coran, Akron; Faith Howard, Beachwood, both of Ohio

[73] Assignee: The University of Akron, Akron, Ohio

[21] Appl. No.: 895,789

[22] Filed: Jul. 17, 1997

[51] Int. Cl.⁶ ..................................................... C08L 9/00
[52] U.S. Cl. .......................................... 525/232; 525/236
[58] Field of Search ..................................... 525/232, 236

[56] References Cited

U.S. PATENT DOCUMENTS

| | | | |
|---|---|---|---|
| 4,104,210 | 8/1978 | Coran et al. | 260/4 |
| 4,130,534 | 12/1978 | Coran | 525/232 |
| 4,130,535 | 12/1978 | Coran et al. | 260/33.6 |
| 4,141,863 | 2/1979 | Coran et al. | 260/3 |
| 4,271,049 | 6/1981 | Coran et al. | 260/4 |
| 4,409,365 | 10/1983 | Coran et al. | 525/78 |
| 4,480,074 | 10/1984 | Wang | 525/240 |
| 4,615,642 | 10/1986 | Mason | 521/143 |
| 4,616,055 | 10/1986 | Mason | 521/81 |
| 4,808,665 | 2/1989 | Patel | 525/194 |
| 4,845,145 | 7/1989 | Hazelton et al. | 524/426 |
| 5,023,301 | 6/1991 | Burlett | 525/232 |
| 5,051,478 | 9/1991 | Puydak et al. | 525/195 |
| 5,073,597 | 12/1991 | Puydak et al. | 525/193 |
| 5,157,081 | 10/1992 | Puydak et al. | 525/237 |

OTHER PUBLICATIONS

"Reclaimed Tire Rubber in TPE Compounds", by John D. Osborn, *Rubber World*, May 1995 Edition, pp. 34–35.

*Primary Examiner*—Paul R. Michl
*Attorney, Agent, or Firm*—Renner, Kenner, Greive, Bobak, Taylor & Weber

[57] ABSTRACT

A method of recycling vulcanized rubber comprising the steps of grinding vulcanized rubber into particles having an average diameter in the range from about 50 μm to about 1.2 mm, and adding the ground tire rubber to a low-modulus binder to form a thermoplastic rubbery composition comprising from about 10 to about 80 parts by weight of the low-modulus binder including from about 25 to about 75 parts by weight of a crystalline polyolefin resin, and from about 25 to about 75 parts by weight of a binder rubber, wherein the rubber is vulcanized by dynamic vulcanization to form fine particles the binder resin, and from about 90 to about 20 parts by weight of ground vulcanized rubber wherein said step of adding the ground rubber occurs at a temperature above the melting point of the crystalline polyolefin resin.

35 Claims, No Drawings

THERMOPLASTIC RUBBERY COMPOSITIONS

TECHNICAL FIELD

This invention relates to thermoplastic rubbery compositions. Specifically, the present invention relates to thermoplastic rubbery compositions that comprise a blend of large vulcanized rubber particles with an improved binder. More particularly, the rubber composition comprises a blend of large vulcanized rubber particles within an improved polyolefinic binder.

BACKGROUND OF THE INVENTION

Used or scrap rubber has become a nuisance. Indeed, many landfills are loaded to capacity with billions of tires, causing both disposal and environmental concerns. In addition to tires, other rubber products, which can include such rubbers as butyl rubber and ethylene-propylene diene rubbers, add to the problem. Because these rubber products are generally not biodegradable, the problem can only be alleviated by the destruction and/or use of the used or scrap rubber.

It is known in the art to de-polymerize waste streams of rubber, such as tires, in an effort to reduce the volume of waste and obtain a useful byproduct. Likewise, rubber products can be devulcanized in an attempt to recycle the waste rubber.

In addition to these techniques, it is common in the art to grind waste streams of rubber and utilize the ground particles. Typically, the rubber is ground to a particle size of about 100 $\mu$m to about 600 $\mu$m. These ground particles are then typically compounded with other polymeric materials in an effort to make useful products.

It has been found, however, that the addition of such ground rubber particles results in a significant deterioration of the mechanical properties of the resulting polymeric composites. To overcome the reduction in physical properties, it is known in the art to condition the ground particles and/or polymeric materials with a coupling agent in an attempt to improve the interaction between the materials. For example, attempts have been made to coat ground rubber particles with ethylene-acrylic acid copolymer, which is believed to improve the interaction of the ground particles with polymeric materials such as linear low density polyethylene. Such composites are believed to have improved impact properties while retaining adequate processing characteristics.

Heretofore in the art, however, the use of ground rubber particles has been limited because of the expense of treating the ground rubber with coatings, such as ethylene-acrylic copolymers, or by using other treatments for the ground rubber. The low cost of the ground waste vulcanized rubber particles can be devoured by such treatments.

Therefore, there is a need for developing a composition of matter employing ground waste rubber, wherein the composition exhibits useful physical properties and good economy.

SUMMARY OF INVENTION

It is therefore, an object of the present invention to provide a method of recycling waste rubber.

It is another object of the present invention to provide a method of recycling tire rubber.

It is yet another object of the present invention to provide a rubbery composition of matter that has low stiffness and yet is highly extensible.

It is still another object of the present invention to provide a thermoplastic soft rubbery composition.

It is yet another object of the present invention to provide a thermoplastic soft rubbery composition including ground tire rubber.

It is still another object to provide a thermoplastic rubbery composition having improved physical properties.

It is yet another object to provide a thermoplastic rubbery composition having improved ultimate tensile strength with low hardness or modulus at 5 percent.

It is yet still another object to provide a thermoplastic rubbery composition that withstands more stretching before breaking than does known compositions employing ground waste rubber and crystalline thermoplastic resin.

At least one or more of the foregoing objects, together with the advantages thereof over the known art relating to rubbery compositions having vulcanized rubber particles therein, especially ground waste rubber, which shall become apparent from the specification that follows, are accomplished by the invention as hereinafter described and claimed.

In general the present invention provides a method of recycling vulcanized rubber comprising the steps of grinding vulcanized rubber into particles having an average diameter in the range from about 50 $\mu$m to about 1.2 mm, and adding the ground tire rubber to a low-modulus binder to form a thermoplastic rubbery composition comprising from about 10 to about 80 parts by weight of the low-modulus binder including from about 25 to about 75 parts by weight of a crystalline polyolefin resin, and from about 25 to about 75 parts by weight of a binder rubber, wherein the rubber is vulcanized by dynamic vulcanization to form fine particles the binder resin, and from about 90 to about 20 parts by weight of ground vulcanized rubber wherein the step of adding the ground rubber occurs at a temperature above the melting point of the crystalline polyolefin resin.

The present invention also includes a thermoplastic rubbery composition comprising from about 10 to about 80 parts by weight of a low-modulus binder including from about 75 to about 25 parts by weight of a crystalline polyolefin resin, and from about 25 to about 75 parts by weight of a binder rubber, and from about 90 to about 20 parts by weight of ground vulcanized rubber particles having an average diameter in the range from about 50 $\mu$m to about 1.2 mm.

The present invention further provides a thermoplastic rubbery composition comprising a crystalline thermoplastic resin matrix having dispersed therein at least two populations of vulcanized rubber particles, wherein a first population of vulcanized rubber particles has an average diameter of less than about 20 $\mu$m, and a second population of vulcanized rubber particles has an average diameter in the range from about 50 $\mu$m to about 1.2 mm.

PREFERRED EMBODIMENT FOR CARRYING OUT THE INVENTION

It has now been found that large particles of vulcanized rubber, those having an average diameter that can exceed about 100 $\mu$m, can be employed in polymeric composite compositions to achieve a thermoplastic processable material having desirable strength and low stiffness. Preferably, the large particles of vulcanized rubber are ground waste rubber; thus the present invention provides a method of recycling waste rubber, such as used tires, to make useful products. The polymeric composites of the present invention, which generally include a blend of a polymeric binder and vulcanized rubber particles, will be referred to as thermoplastic rubbery compositions.

In one embodiment, the thermoplastic rubbery composition of the present invention includes a first component (I), which is a binder, and a second component (II) comprising ground vulcanized rubber. The binder (I) comprises a blend of (a) a binder resin, which is a crystalline thermoplastic polyolefin resin and (b) a binder rubber. The composition generally includes from about 80 to about 10 parts by weight of (I) the binder and from about 20 to about 90 parts by weight of (II) the ground vulcanized rubber. In a preferred embodiment, the thermoplastic rubbery composition includes from about 60 to about 20 parts by weight of the binder and from about 40 to about 80 parts by weight of the ground vulcanized rubber, and even more preferably from about 50 to about 25 parts by weight of the binder and from about 50 to about 75 parts by weight of the ground vulcanized rubber.

With specific regard to the binder, the binder component (I) should include from about 75 to about 20 parts by weight of (a) the binder resin, and from about 25 to about 75 parts by weight of (b) the binder rubber. Preferably, the binder will include from about 65 to about 35 parts by weight of the thermoplastic binder resin and from about 35 to about 65 parts by weight of the binder rubber, and even more preferably from about 60 to about 40 parts by weight of binder resin and from about 40 to about 60 parts by weight of the binder rubber. For purposes of this specification, the terms binder resin, crystalline thermoplastic polyolefin resin and thermoplastic binder resin will be used interchangeably.

In a preferred embodiment, the binder rubber is crosslinked. Preferably, this crosslinking is accomplished by dynamic vulcanization. Dynamic vulcanization is the process whereby a mixture of a rubber and a thermoplastic binder resin are mixed or masticated while the rubber component undergoes a vulcanization process for affecting the crosslinking of the rubber. Dynamic vulcanization should occur at a temperature above the melting point of the resin. It should be appreciated that this melting temperature is the temperature of the resin within the particular environment. For example, the melt temperature may be lowered when the binder resin is in the presence of an extender oil. As a result of dynamic vulcanization, the rubber is crosslinked and dispersed as fine particles within the thermoplastic binder resin. Although dynamic vulcanization is the preferred process for obtaining the binder, it should be appreciated that other methods can be used to prepare the binder. For example, the rubber can be fully vulcanized in the absence of the crystalline polyolefin resin, powdered, and mixed with the polyolefin resin at a temperature above the melting or softening point of the polyolefin resin.

Where the binder rubber is vulcanized or crosslinked, the crosslinked binder rubber should have a number average diameter of less than 50$\mu$, preferably less than 25$\mu$, more preferably less than 10$\mu$, even more preferably less than 5$\mu$, and still more preferably less than 2$\mu$. As those skilled in the art will appreciate, crosslinked binder rubber that is dispersed within a resin, and which has a number average diameter of less than about 2$\mu$ are typically achieved by using dynamic vulcanization techniques. Although the addition of prevulcanized particles ground to the appropriate size is contemplated.

In a preferred embodiment, oil-extended EPDM rubber is used in the binder or an extender oil is added during or after the preparation of the binder. The oil can be any of the types used to prepare oil-extended EPDM rubbers. Examples of extender oils are Sunpar®150 and Sunpar®2280, which are extender oils available from the Sun Oil Company. Extender oils are particularly useful when the crystalline polyolefin is isotactic polypropylene, e.g., D008M available from Aristech. The extender oil is preferably added in an amount between 10 and about 200 parts by weight per hundred parts rubber, including both the binder rubber and ground vulcanized rubber. The various grades of Santoprene®, which are oil-extended polypropylene/EPDM thermoplastic elastomers, can be used as the binder in the present invention.

Once crosslinked, it is preferred that the binder be a low-modulus binder. In general, the binder should have a Young's modulus of less than about 200 MPa, preferably less than about 150 MPa, and more preferably less than about 75 MPa.

As discussed above, the rubbery composition includes a second component, (II), comprising ground vulcanized rubber. The ground vulcanized rubber should have an average diameter of less than about 1.2 mm, preferably in the range from about 50 $\mu$m to about 600 $\mu$m, more preferably in the range from greater than about 50 $\mu$m to about 300 $\mu$m, and even more preferably form greater than 50 $\mu$m to about 100 $\mu$m.

In another embodiment, the thermoplastic rubbery composition of the present invention comprises a crystalline thermoplastic resin matrix having dispersed therein at least two populations of vulcanized rubber particles. At least one population, hereinafter the first population, includes vulcanized rubber particles having a number average diameter of less than about 20 $\mu$m. At least another population, hereinafter the second population, includes vulcanized rubber particles having a number average diameter of less than about 1.2 mm. Preferably, the first population includes vulcanized rubber particles having a number average diameter of less than about 10 $\mu$m, and more preferably less than about and about 5 $\mu$m. The second population preferably includes vulcanized rubber particles having a number average diameter in the range from about 50 $\mu$m to about 600 $\mu$m, more preferably in the range from greater that about 50 $\mu$m to about 300 $\mu$m, and even more preferably form greater than 50 $\mu$m to about 100 $\mu$m.

In preparing the thermoplastic rubbery compositions of this embodiment, it is preferred to first prepare a binder comprising the crystalline thermoplastic resin and the first population of vulcanized rubber particles. The first population of rubber particles are dispersed within the thermoplastic resin. Preferably, the dispersion is achieved by dynamically vulcanizing a rubber within the thermoplastic binder resin at a temperature above the melting point of the thermoplastic binder resin to form the first population of vulcanized rubber particles. Once the binder is formed, the second plurality of vulcanized rubber particles is added to the binder and intimately mixed so as to create a dispersion of the first and second populations of vulcanized rubber particles within the thermoplastic binder resin. The addition of both populations of vulcanized rubber particles should occur above the melting point of the crystalline thermoplastic binder resin.

The crystalline thermoplastic polyolefin resin, or simply binder resin, that is employed in the present invention is preferably high density polyethylene or polypropylene. Other resins include low density polyethylene, linear low density polyethylene and polybutylene, as well as copolymers of ethylene with vinylacetate, acrylic acid, methyl acrylate, ethyl acrylate, etc. It should be appreciated that mixtures of these resins can be employed.

As used herein, the term polypropylene can include homopolymers of polypropylene, as well as reactor copolymers of polypropylene that contain from 1 to about 20 percent by weight ethylene, or another alpha olefin of about 4 to about 16 carbon atoms. The polypropylene can be highly crystalline isotactic or syndiotactic polypropylene. The copolymers can be either a random or block copolymer, but is preferably substantially crystalline.

Polyolefin resins that can optionally be included in the compositions of the present invention include polybutylene, LDPE and LLDPE as well as copolymers of ethylene with unsaturated esters of lower carboxylic acids. The term "polybutylene" generally refers to thermoplastic resins of both poly (1-butene) homopolymer and the copolymer with, for example, ethylene, propylene, pentene-1, etc. Polybutylene is manufactured via a stereo-specific Ziegler-Natta polymerization of monomer(s). Commercially useful polyolefin resin are of high molecular weight and isotacticity. A variety of commercial grades of both homopolymer and ethylene copolymer are available with melt indices that range from about 0.3 to about 20 g/10 min.

The term "low density polyethylene" or "LDPE" as used in this specification and claims mean both low and medium density polyethylene having densities of about 0.910 to bout 0.940 g/cc. The terms include linear polyethylene as well as copolymers of ethylene that are thermoplastic resins.

Linear low density polyethylene (LLDPE) is a relatively new class of low density polyethylene characterized by little, if any, long chain branching, in contrast to conventional LDPE. The processes for producing LLDPE are well known in the art and commercial grades of this polyolefin resin are available.

Polyethylene copolymers suitable as the polyolefin resins of this invention include copolymers of ethylene with unsaturated esters of lower carboxylic acids as well as the carboxylic acids per se. In particular, copolymers of ethylene with vinylacetate or alkyl acrylates for example methyl acrylate and ethyl acrylate can be employed. These ethylene copolymers typically comprise from about 60 to about 97 percent by weight ethylene, preferably from about 70 to about 95 percent by weight ethylene, more preferably from about 75 to about 90 percent by weight ethylene. The expression "ethylene copolymer resin" as used in this specification and claims means, generally, copolymers of ethylene with unsaturated esters of lower ($C_1$–$C_4$) monocarboxylic acids and the acids themselves; e.g., acrylic acid, vinyl esters or alkyl acrylates, while the expression "EVA" means, specifically, ethylene-vinylacetate copolymers. Illustrative of the acrylates that can be utilized are methyl acrylate and ethyl acrylate.

Specific examples of resin useful in the present invention include crystalline polyethylene available from Phillips under the tradename Marlex, and crystalline polypropylene available from Aristech, e.g., the grade D008M.

In one preferred embodiment, the binder resin employed in the present invention is scrap thermoplastic material including, but not limited to, polyethylene, obtained from recycled milk bottles. Accordingly, the present invention provides a method of recycling thermoplastics.

In one embodiment of the present invention, the binder resin is prereacted or modified by the action of a modifying agent such as a phenolic-resin curative, or resole. Such curatives can be obtained from Schenectady International, Inc., sold under the trade name SP-1045. This polyolefin resin modification reaction typically takes place in the presence of a Lewis acid, e.g., stannous chloride. This can improve the bonding between the ground vulcanized rubber and the binder.

The term binder rubber as used herein refers to any natural or synthetic rubbery polymer, or blend thereof, that can be vulcanized or cured so as to exhibit elastomeric properties. Some rubbers that, for example, can be employed include natural rubber, butadiene rubber, styrene-butadiene rubber, butyl rubber, halo-butyl rubber, ethylene propylene rubber (EPM), ethylenepropylene diene rubber (EPDM), polyisoprene, polychloroprene, polybutene copolymers, chlorosulfonated polyethylene, etc. It should be understood that mixtures of various rubbers can also be employed in the practice of the present invention. EPDM rubber is most preferred in the practice of the present invention.

The terms EPM and EPDM are used in the sense of their ASTM designations. EPM is an ethylene-propylene copolymer that can be crosslinked by radiation curing or peroxide curing. EPDM is a terpolymer of ethylene, propylene and a non-conjugated diene. Illustrative non-limiting examples of suitable non-conjugated dienes are 5-ethylidene-2-norbornene (ENB); 1,4-hexadiene; 5-methylene-2-norbornene (MNB); 1,6-octadiene; 5-methylene-2-hexadiene; 3,7-dimethyl-1,6-octadiene; 1,3-cyclopentadiene; 1,4-cyclohexadiene; tehahydroindene, methyltetrahydroindene, dicyclopentadiene; 5-isopropylidene-2-norbornene; 5-vinyl-norbornene, etc.

Butyl rubber is a copolymer of an isoolefin and a conjugated multiolefin. The useful copolymers comprise a major portion of isoolefin and a minor amount, preferably not more than 30 percent by weight, of a conjugated multiolefin. The preferred copolymers comprise about 85 to about 99.5 percent by weight of a $C_4$–$C_7$ isoolefin, such as isobutylene, and about 15 to about 0.5 percent by weight of a multiolefin of about 4 to about 14 carbon atoms.

The term "high unsaturation rubber" as used herein and in the claims means an essentially random noncrystalline, rubbery homopolymer of a diolefin or copolymer in which the major component of the polymer chain is derived from a diolefin and includes both natural and synthetic rubber. High unsaturation diene rubbers contain a high proportion of ethylenic unsaturation within the chain. High unsaturation diene rubbers suitable for the practice of the invention comprise polymers of 1,3-butadiene and isoprene and their copolymers with vinyl arenes, such as styrene. Commercially available high unsaturation diene rubbers suitable for the practice of the present invention are described in *Rubber World Blue Book*, 1975 Edition, "Materials and Compounding Ingredients for Rubber" as follows: Natural Rubber, pages 389–394, Polybutadiene Rubber, pages 431–432, Polyisoprenes, pages 439–440 and styrene butadiene rubbers, pages 452–460.

Specific examples of rubber useful in the present invention include EPDM available from Exxon under the tradename Vistalon 5600, and Butyl Rubber available from Exxon.

As discussed above, the binder rubber component of the present invention is preferably vulcanized, e.g., by dynamic vulcanization. Any conventional cure system for the rubber to be dynamically vulcanized can be used except that peroxide cures are less preferred in the practice of this invention especially when polypropylene is used. Under conditions that would result in a fully cured rubber by using peroxide, the polypropylene resin would degrade and thereby result in a lower strength composition. Otherwise, any particular curatives known in the art for the vulcanization of rubbers are suitable. These include sulfur cures as well as non-sulfur cures. For example, halogenated butyl rubber can be cured by using zinc oxide alone. Of course, accelerators such as dithiocarbamates, thuirams, diamines and thioureas can be included in these zinc oxide cures. Zinc oxide free cures of halogenated butyl rubber known in the art can be utilized. For example, one such vulcanizing system comprises litharge, 2-mercaptoimidazoline and diphenyl guanidine.

Phenolic resin curatives can be used for butyl rubber, halogenated butyl rubber and the EPDM rubbers. The phenolic resins useful as curatives are methylol phenolic resins, brominated methylol phenolic resins, urethane resins, etc. The halogenated resin cure systems are generally Lewis-acid activated where the rubber is an EPDM. This type of curative also includes 2,6-dimethylol-4 alkyl-phenols that are not resinous.

In a preferred embodiment, a methylol phenolic-resin curative is employed. Theses curatives are alkylated resoles, which are typically made by the condensation of an alkyl substituted phenol with a formaldehyde, in an alkaline medium or by condensation of a bi-functional phenoldialcohols. Dimethylol-phenolic resins are commercially available from Schenectady International, Inc., of Schenectady, N.Y.

With respect to the ground vulcanized rubber, which may also be referred to as the second plurality of rubber particles or simply the large vulcanized rubber particles, the rubber can include vulcanized rubber including polyisoprene, styrene-butadiene rubber, natural rubber, butadiene rubber, EPDM, butyl rubber, and halo-butyl rubber. These vulcanized rubber particles can be the result of any curing or vulcanization process or system including those cure systems described hereinabove.

In a preferred embodiment, the ground vulcanized rubber comprises recycled vulcanized rubber. For example, the ground vulcanized rubber can include ground tire rubber. Also, the ground vulcanized rubber can include ground rubber scrap, mold flash, rejected parts, etc. Accordingly, the present invention provides a method for recycling tire rubber and ground waste rubber. It is most preferred to employ ground tire rubber.

Inasmuch as recycled materials can be employed, the vulcanized rubber particles may include fillers, antioxidants, stabilizers, rubber processing oils, lubricants, anti-blocking agents, waxes, foaming agents, pigments, coupling agents for the fillers and other processing aids known to the rubber compounding art. The ground tire rubber can also include minor amounts of short fibers derived from the tire cords of the waste or used tires. It should be appreciated, however, that any additional ingredient within the vulcanized rubber particles should not have a deleterious impact upon the thermoplastic rubbery compositions of the present invention.

Where the ground vulcanized rubber comprises recycled, used or scrap rubber such as used tires, it is preferred that the ground vulcanized rubber have an average particle size of less than about 1.2 mm, more preferable less than about 600 $\mu$m, even more preferably less than about 300 $\mu$m and still more preferably less than about 150 $\mu$m. Such ground tire rubber can be obtained, for example, by cryo-grinding used or scrap tire rubber. Typically, the average particle size of the ground tire rubber is greater than about 50 $\mu$m.

Thermoplastic rubbery compositions of the present invention are useful for making a variety of articles such as hoses, gaskets, moldings, small off-road tires e.g., for lawn mowers, floor mats, toys, etc. They are particularly useful for making articles by extrusion, injection molding and compression molding techniques.

In order to demonstrate the practice of the present invention, examples have been prepared and tested as described in the General Experimentation Section disclosed hereinbelow. The examples should not, however, be viewed as limiting the scope of the invention. The claims will serve to define the invention.

GENERAL EXPERIMENTATION

A binder (II) recipe pursuant to the present invention was prepared according to the recipe in Table I.

TABLE I

| Ingredient | (parts by weight) |
| --- | --- |
| Marlex EHM-6007 | 60 |
| Vistalon 5600 | 40 |
| SP-1045 | 4 |
| SnCl$_2$.2H$_2$O | 0.4 |
| ZnO | 5 |

Preparation of the binder took place within a Haake-Rheocorder System 90 internal mixer at 180° C. and 80 rpm. The rubber was placed into the mixer along with the zinc oxide and the stannous chloride, and mixed for about two minutes. The thermoplastic binder resin (Marlex EHM-6007 HDPE) was then added and mixing continued until a melt peak was observed. Mixing was then continued for approximately three more minutes, at which point the curative was slowly added. The composition was mixed and vulcanization of the rubber was monitored by following mixing torque as a function of mixing duration. Mixing was continued for an additional 1.5 minutes after the achievement of a maximum mixing torque. The composition was removed from the mixer and cooled.

This binder was mixed with ground tire rubber purchased from Gould Industries sold under the tradename Micron GTC-495. This mixing took place at 145° C. Blend ratios ranging from about 30 parts by weight binder to about 90 parts by weight binder were prepared.

For purposes of comparison, crystalline polyethylene obtained from Phillips Chemical under the tradename Marlex EHM-6007, was likewise blended with the ground tire rubber. This mixing also took place at 145° C., and blend ratios ranging from about 10 parts by weight crystalline polyethylene binder to about 90 parts by weight crystalline polyethylene binder were prepared.

The various blends, described hereinabove, were formed into test sheets by compression molding. The test sheets were then subjected to various physical tests, the results of which are identified in Table II, hereinbelow. The test methods employed were those ASTM standardized tests that are typically employed in the art.

TABLE II

Physical Properties of Thermoplastic Rubbery Compositions

| Recipes | A | B | C | D | E | F | G | H |
|---|---|---|---|---|---|---|---|---|
| Ground Tire Rubber | 10 | 10 | 20 | 20 | 30 | 30 | 40 | 40 |
| Binder I[a] | — | 90 | — | 80 | — | 70 | — | 60 |
| Binder II[b] | 90 | — | 80 | — | 70 | — | 60 | — |
| Ultimate Tensile Strength (MPa) | 16.93 | 27.43 | 15.31 | 22.54 | 12.57 | 16.62 | 10.57 | 14.35 |
| Ultimate Elongation (%) | 354 | 8 | 330 | 9 | 310 | 6 | 250 | 11 |
| Shore A Hardness | 92 | 95 | 91 | 95 | 90 | 95 | 89 | 95 |
| Shore D Hardness | 41 | 66 | 40 | 61 | 39 | 60 | 37 | 54 |
| 5% Modulus | 6.31 | 25.84 | 5.24 | 20.5 | 4.260 | 15.83 | 3.19 | 12.59 |
| True Stress at Break (MPa) | 76.9 | 29.6 | 65.8 | 24.6 | 51.5 | 17.6 | 37.0 | 15.9 |
| (Ultimate Tensile Strength) ÷ (5% Modulus MPA) | 2.683 | 1.061 | 2.921 | 1.099 | 2.950 | 1.050 | 3.313 | 1.139 |
| True Strength at Break ÷ (5% Modulus) | 12.18 | 1.146 | 12.56 | 1.198 | 12.09 | 1.113 | 11.59 | 1.265 |

| Recipes | H | I | J | K | L | M | N | O | P |
|---|---|---|---|---|---|---|---|---|---|
| Ground Tire Rubber | 40 | 50 | 50 | 60 | 60 | 70 | 70 | 80 | 90 |
| Binder I[a] | 60 | — | 50 | — | 40 | — | 30 | 20 | 10 |
| Binder II[b] | — | 50 | — | 40 | — | 30 | — | — | — |
| Ultimate Tensile Strength (MPa) | 14.35 | 10.03 | 11.39 | 8.57 | 8.407 | 7.53 | 6.40 | 4.86 | 4.11 |
| Ultimate Elongation (%) | 11 | 241 | 19 | 244 | 22 | 213 | 39 | 65 | 123 |
| Shore A Hardness | 95 | 88 | 94 | 85 | 93 | 80 | 92 | 86 | 75 |
| Shore D Hardness | 54 | 33 | 54 | 32 | 47 | 29 | 42 | 34 | 26 |
| 5% Modulus | 12.59 | 2.42 | 8.997 | 1.72 | 6.137 | 1.277 | 3.75 | 1.914 | 0.771 |
| True Stress at Break (MPa) | 15.9 | 34.2 | 13.6 | 29.5 | 10.3 | 23.6 | 8.9 | 8.0 | 9.2 |
| (Ultimate Tensile Strength) ÷ (5% Modulus MPA) | 1.139 | 4.144 | 1.266 | 4.982 | 1.369 | 5.896 | 1.707 | 2.538 | 5.329 |
| True Stress at Break ÷ (5% Modulus) | 1.265 | 14.13 | 1.507 | 17.14 | 1.671 | 18.45 | 2.373 | 4.188 | 11.88 |

[a]crystalline polyethylene
[b]present invention: See Table I

Accordingly, a review of the data within Table II indicates that the compositions including ground tire rubber and the binder according to the present invention demonstrate improved strength coupled with low stiffness, especially when compared with those compositions that simply employ polyethylene as a binder.

Thus it should be evident that the compositions of the present invention are highly useful and improved over known thermoplastic rubbery compositions, especially those employing used or scrap tire rubber. It should also be evident that the method of the present invention is highly effective in recycling tire rubber. The invention is particularly suited for recycling tire rubber, but is not necessarily limited thereto. The composition and method of the present invention can be used separately or with other additives, methods and the like.

Based upon the foregoing disclosure, it should now be apparent that the use of the thermoplastic rubbery compositions described herein will carry out the objects set forth hereinabove. It is, therefore, to be understood that any variations evident fall within the scope of the claimed invention and thus, the selection of specific component elements can be determined without departing from the spirit of the invention herein disclosed and described. Accordingly, the scope of the invention shall include all modifications and variations that may fall within the scope of the attached claims.

What is claimed is:

1. A method of recycling vulcanized rubber comprising the steps of:
   grinding vulcanized rubber into ground rubber particles having an average diameter in the range from about 50 μm to about 1.2 mm; and
   adding the ground rubber to a low-modulus binder to form a thermoplastic rubbery composition comprising:
   (I) from about 10 to about 40 parts by weight of the low-modulus binder including
      (a) from about 25 to about 75 parts by weight of a crystalline polyolefin resin, and
      (b) from about 25 to about 75 parts by weight of a binder rubber, wherein the binder rubber is vulcanized by dynamic vulcanization to form fine particles within the binder resin, said particles having an average diameter of less than about 20 μm; and
   (II) from about 90 to greater than 50 parts by weight of the ground vulcanized rubber particles, wherein the low-modulus binder and the ground vulcanized rubber particles total one hundred parts by weight;
   wherein said step of adding the ground rubber occurs at a temperature above the melting point of the crystalline polyolefin resin.

2. A method of recycling vulcanized rubber, as set forth in claim 1, wherein the binder rubber (b) is selected from the group consisting of EPDM, natural rubber, styrene-butadiene rubber, butadiene rubber, butyl rubber and halobutyl rubber.

3. A method of recycling vulcanized rubber, as set forth in claim 1, wherein dynamic vulcanization of the binder rubber is effected by a curative selected from the group consisting of phenolic resin curatives and accelerated sulfur.

4. A method of recycling vulcanized rubber, as set forth in claim 3, wherein the curative is a methylolphenolic resin.

5. A method of recycling vulcanized rubber, as set forth in claim 1, wherein the low-modulus binder has a Young's modulus of less than about 200 MPa.

6. A method of recycling vulcanized rubber, as set forth in claim 1, wherein the crystalline polyolefin resin is selected from the group consisting of polyethylene and polypropylene.

7. A method of recycling vulcanized rubber, as set forth in claim 1, wherein the composition further comprises an extender oil.

8. A method of recycling vulcanized rubber, as set forth in claim 1, wherein said step of grinding creates particles having an average diameter in the range form greater than about 50 µm to about 300 µm.

9. A thermoplastic rubbery composition comprising:
   (I) from about 10 to about 40 parts by weight of a low-modulus binder including
       (a) from about 75 to about 25 parts by weight of a crystalline polyolefin resin, and
       (b) from about 25 to about 75 parts by weight of a binder rubber in the form of particles having an average diameter of less than about 20 µm, said binder rubber having been dynamically vulcanized; and
   (II) from about 90 to greater than 50 parts by weight of ground vulcanized rubber particles having an average diameter in the range from about 50 µm to about 1.2 mm, wherein said low-low-modulus binder and said ground vulcanized rubber particles total one hundred parts by weight.

10. A thermoplastic rubbery composition, as set forth in claim 9, wherein said rubber (b) within said binder is crosslinked.

11. A thermoplastic rubbery composition, as set forth in claim 10, wherein said binder rubber (b) is dispersed as fine particles in said resin (a).

12. A thermoplastic rubbery composition, as set forth in claim 9, wherein said ground vulcanized rubber particles (II) are ground tire rubber.

13. A thermoplastic rubbery composition, as set forth in claim 9, wherein said binder rubber (b) is selected from the group consisting of EPDM, natural rubber, styrene-butadiene rubber, butadiene rubber, butyl rubber and halobutyl rubber.

14. A thermoplastic rubbery composition, as set forth in claim 10, wherein said binder rubber (b) is crosslinked with a curative selected from the group consisting of phenolic-resin curatives and accelerated sulfur.

15. A thermoplastic rubbery composition, as set forth in claim 9, wherein said binder rubber is EPDM that has been crosslinked with a methylolphenolic resin.

16. A thermoplastic rubbery composition, as set forth in claim 9, wherein said low-modulus binder (I) has a Young's modulus of less than about 200 MPa.

17. A thermoplastic rubbery composition, as set forth in claim 9, wherein the crystalline polyolefin resin (a) is selected from the group consisting of polyethylene and polypropylene.

18. A thermoplastic rubbery composition, as set forth in claim 9, wherein said low-modulus binder (I) has a Young's modulus of less than about 100 MPa.

19. A thermoplastic rubbery composition, as set forth in claim 9, wherein the composition further comprises an extender oil.

20. A thermoplastic rubbery composition, as set forth in claim 17, wherein the crystalline polyolefin resin (a) is polyethylene.

21. A thermoplastic rubbery composition, as set forth in claim 17, wherein the crystalline polyolefin resin (a) is polypropylene.

22. A thermoplastic rubber compositions, as set forth in claim 9, wherein said ground vulcanized rubber particles have an average diameter in the range from greater than about 50 µm to about 600 mm.

23. A thermoplastic rubber compositions, as set forth in claim 9, wherein said low-modulus binder includes from about 65 to about 35 parts by weight of said crystalline polyolefin resin, and from about 35 to about 65 parts by weight of said binder rubber.

24. A thermoplastic rubbery composition comprising:
    a crystalline thermoplastic resin matrix having dispersed therein at least two populations of vulcanized rubber particles, wherein a first population of vulcanized rubber particles has an average diameter of less than about 20 µm, and a second population of vulcanized rubber particles has an average diameter in the range from about 50 µm to about 1.2 mm.

25. A thermoplastic rubbery composition, as set forth in claim 24, wherein said first population of vulcanized rubber particles has an average diameter of less than about 10 µm and said second population of vulcanized rubber particles has an average diameter in the range from about 50 µm to about 600 mm.

26. A thermoplastic rubbery composition, as set forth in claim 24, wherein said first population of vulcanized rubber particles has an average diameter of less than about 5 µm and said second population of vulcanized rubber particles has an average diameter in the range from about 50 µm to about 300 mm.

27. A method of recycling vulcanized rubber, as set forth in claim 1, wherein the thermoplastic rubbery composition comprises from about 20 to about 40 parts by weight of the low-modulus binder and from about 80 to about 60 parts by weight of the ground vulcanized rubber particles.

28. A method of recycling vulcanized rubber, as set forth in claim 1, wherein the thermoplastic rubbery composition comprises from about 30 to about 40 parts by weight of the low-modulus binder and from about 70 to 60 parts by weight of the ground vulcanized rubber particles.

29. A thermoplastic rubber composition, as set forth in claim 9, wherein the thermoplastic rubbery composition comprises from about 20 to about 40 parts by weight of said low-modulus binder and from about 80 to about 60 parts by weight of said ground vulcanized rubber particles.

30. A thermoplastic rubber composition, as set forth in claim 9, wherein the thermoplastic rubbery composition comprises from about 30 to about 40 parts by weight of the low-modulus binder and from about 70 to 60 parts by weight of the ground vulcanized rubber particles.

31. A thermoplastic rubber composition, as set forth in claim 9, wherein said binder rubber is dispersed within said crystalline polyolefin resin and has a number average diameter of less than 50 µm.

32. A thermoplastic rubber composition, as set forth in claim 9, wherein said binder rubber is dispersed within said crystalline polyolefin resin and has a number average diameter of less than 10 µm.

33. A thermoplastic rubbery composition, as set forth in claim 1, wherein the composition demonstrates an ultimate elongation greater than 213 percent.

34. A thermoplastic rubbery composition, as set forth in claim 1, wherein the composition demonstrates a 5 percent modulus below 2.42 MPa.

35. A thermoplastic rubbery composition, as set forth in claim 1, wherein the composition demonstrates a tensile strength at break greater than 7.53 MPa.

* * * * *